US006669362B1

(12) United States Patent
Lin et al.

(10) Patent No.: US 6,669,362 B1
(45) Date of Patent: Dec. 30, 2003

(54) TWO-WAY DISPLAY INFRARED THERMOMETER

(75) Inventors: Kevin Lin, Hsin-Chu (TW); Simon Tsao, Hsin-Chu (TW); Chu Chung Yin, Hsin-Chu (TW); Vincent Weng, Hsin-Chu (TW)

(73) Assignee: Radiant Innovation Inc., Hsinchu (TW)

( * ) Notice: Subject to any disclaimer, the term of this patent is extended or adjusted under 35 U.S.C. 154(b) by 0 days.

(21) Appl. No.: 10/247,495

(22) Filed: Sep. 20, 2002

(51) Int. Cl.[7] .............................. G01D 7/00; G01J 5/02
(52) U.S. Cl. ...................... 374/121; 374/208; 345/659
(58) Field of Search ................ 345/659; 374/131, 374/124, 121, 208; 356/43; 340/691.6, 691.1

(56) References Cited

U.S. PATENT DOCUMENTS

| 4,527,896 A | | 7/1985 | Irani et al. ................ 356/43 |
| 4,634,294 A | * | 1/1987 | Christol et al. ........... 374/124 |
| 4,722,612 A | * | 2/1988 | Junkert et al. ............. 374/124 |
| 4,823,080 A | * | 4/1989 | Lin .......................... 345/659 |
| 4,867,574 A | | 9/1989 | Jenkofsky ................. 374/121 |
| 5,017,018 A | * | 5/1991 | Iuchi et al. ................ 374/124 |
| 5,018,875 A | * | 5/1991 | Cook ........................ 374/208 |
| 5,189,408 A | * | 2/1993 | Teicher ...................... 340/691 |
| 5,709,476 A | * | 1/1998 | Wu et al. ................... 374/208 |
| 5,772,323 A | | 6/1998 | Felice ....................... 374/127 |
| 5,836,692 A | * | 11/1998 | Pompei ..................... 374/121 |
| 6,095,682 A | | 8/2000 | Hollander et al. .......... 374/121 |

* cited by examiner

Primary Examiner—Christopher W. Fulton
Assistant Examiner—Stanley J. Pruchnic, Jr.
(74) Attorney, Agent, or Firm—Rosenberg, Klein & Lee

(57) ABSTRACT

A two-way display infrared thermometer comprises a main body. An infrared wave-collecting device is disposed at the front end in the main body. A sensor is disposed at the bottom of the infrared wave-collecting device. A liquid crystal display is disposed on the surface of the main body to display the temperature. A direction detection device is disposed in the main body to detect the horizontal state of the main body so as to control the display direction of the liquid crystal display. A mount is disposed on the main body so that the main body can be supported and adjust the angle of measurement. A direction-switching device is disposed on the main body for manually switching the display direction of the liquid crystal display. Thereby, the infrared thermometer can straightly display the measured temperature for quick reading of the temperature value regardless of standing upright or upside down.

11 Claims, 6 Drawing Sheets

TWO-WAY DISPLAY INFRARED THERMOMETER

FIELD OF THE INVENTION

The present invention relates to an infrared thermometer and, more particularly, to an infrared thermometer capable of straightly displaying the temperature value regardless of standing upright or upside down.

BACKGROUND OF THE INVENTION

Recently, because non-contact type infrared thermometers can measure the temperature without contact with a target, they are widely used as industrial thermometers. However, a conventional infrared thermometer usually has no mount. When a target needs to be measured for a long time, one must hold the thermometer and aim at the target for measurement for a long time. If the user needs to simultaneously observe the target and the thermometer, it will be difficult and inconvenient for him to read and record the displayed measurement value of the thermometer.

In the disclosure of U.S. Pat. No. 6,095,682, as shown in FIG. 1, an adaptation mouth 12 having a thread is disposed at the lower side of an infrared thermometer 10 so that a mount 14 can be screwed into the adaptation mouth 12 for connection. Although the inconvenience of holding the thermometer for measurement is saved, the adapted mount 14 is too bulky to be taken along conveniently. Moreover, the infrared thermometer must have the adaptation mouth 12 to connect the mount 14.

Accordingly, the present invention aims to propose an infrared thermometer having a mount to be able to display the measurement value in two directions regardless of standing upright or upside down, thereby conforming to the direction of measurement.

SUMMARY OF THE INVENTION

The primary object of the present invention is to provide a two-way display infrared thermometer, which utilizes a direction detection device to detect the direction of the thermometer itself so that the thermometer can straightly display the measurement value regardless of standing upright or upside down, thereby facilitating reading and recording of the measured temperature for users.

Another object of the present invention is to provide an infrared thermometer having a mount so that the thermometer can naturally stand when measuring the temperature, hence avoiding the inconvenience of holding the thermometer for a long time.

According to the present invention, a two-way display infrared thermometer comprises a main body. An infrared wave-collecting device is disposed at the front end in the main body. A sensor is disposed at the bottom of the infrared wave-collecting device. A liquid crystal display is disposed on the surface of the main body to display the measured temperature. A direction detection device is disposed in the main body to detect the horizontal state of the main body so as to control the display direction of the liquid crystal display. A mount is disposed on the main body to support the main body. A direction-switching device is additionally disposed on the main body for manually switching the display direction of the liquid crystal display.

The various objects and advantages of the present invention will be more readily understood from the following detailed description when read in conjunction with the appended drawing, in which:

DETAILED DESCRIPTION OF THE PREFERRED EMBODIMENTS

Figure 1:
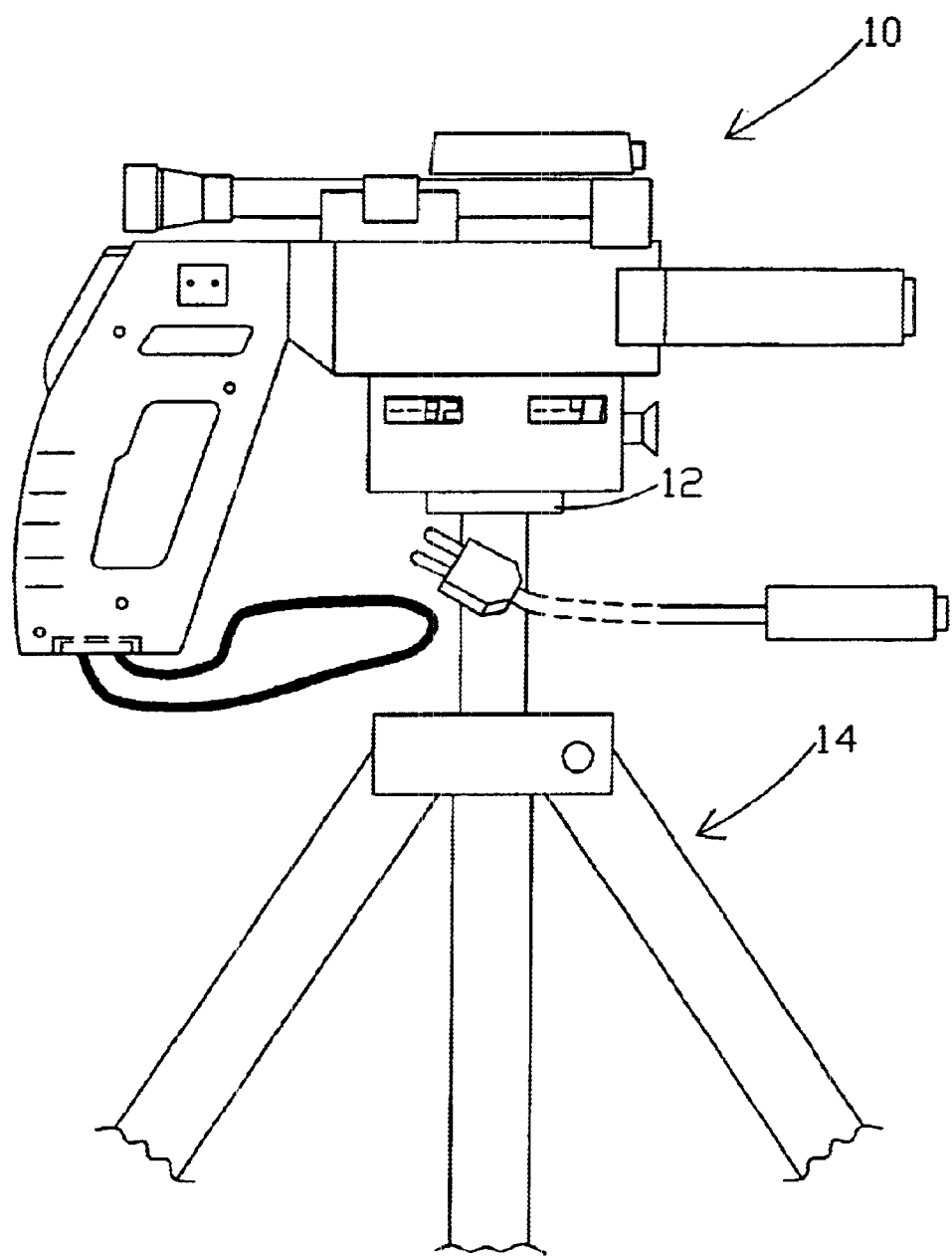
FIG. 1 is a diagram of a conventional infrared thermometer connected with an external mount.
Figure 2:
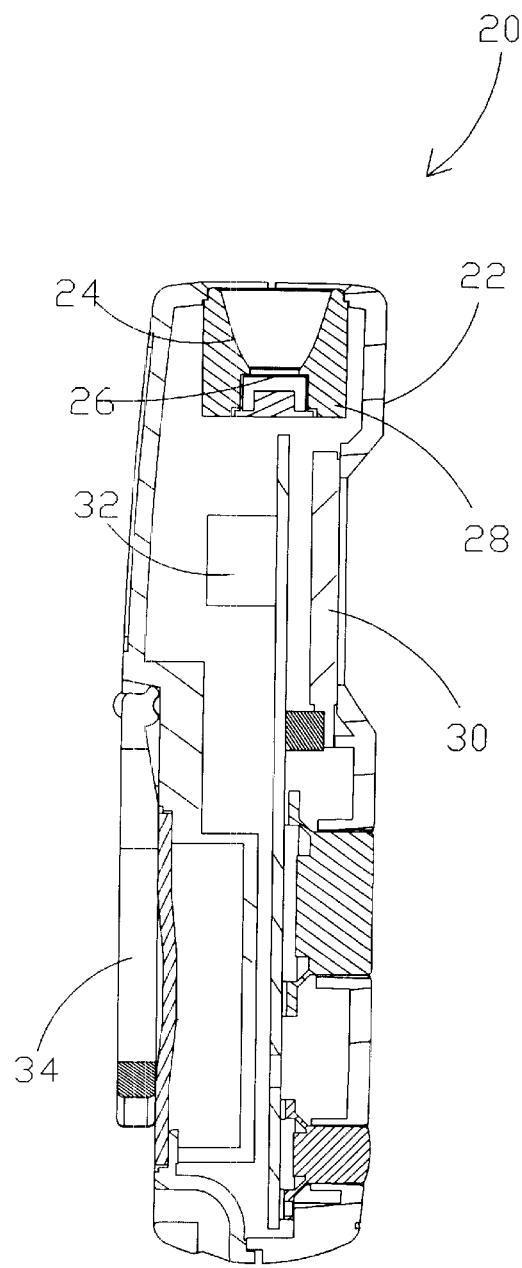
FIG. 2 is a structure diagram of the present invention.

As shown in FIG. 2, a two-way display infrared thermometer 20 of the present invention comprises a main body 22. An infrared wave-collecting device 24 is disposed at the front end in the main body 22. A sensor 26 is disposed at the bottom of the infrared wave-collecting device 24 to detect the received infrared energy. A thermal absorption device 28 is disposed around the infrared wave-collecting device 24 in the main body 22 to absorb thermal energy radiated by external objects not to be measured, hence ensuring the accuracy of the sensor 26. A liquid crystal display 30 is disposed on the front face of the main body 22 to display the measured temperature. A decimal point can be displayed at both the upper side and the lower side of the liquid crystal display 30. A direction detection device 32 connected to a control circuit is disposed in the main body 22. The control circuit is usually a microprocessor. The direction detection device 32 is used to detect the horizontal state of the main body 22 so as to send a signal to the control circuit, which then issues an instruction to control the direction of the displayed temperature value of the liquid crystal display 30. The direction detection device 32 is usually a mercury switch or a ball switch. Additionally, a foldable mount 34 is disposed on the back of the main body 22 so that the main body 22 can be supported and adjust the angle of measurement.

In addition to utilizing the direction detection device matched with the control circuit to automatically detect and control the direction of the displayed temperature value, a direction-switching device (not shown) can also be disposed on the main body 22. The direction-switching device can be a key module or a switch module connected with the control circuit. The direction-switching device is manually switched to send a switching signal to the control circuit, which then controls the display direction of the liquid crystal display 30.

Figure 3:
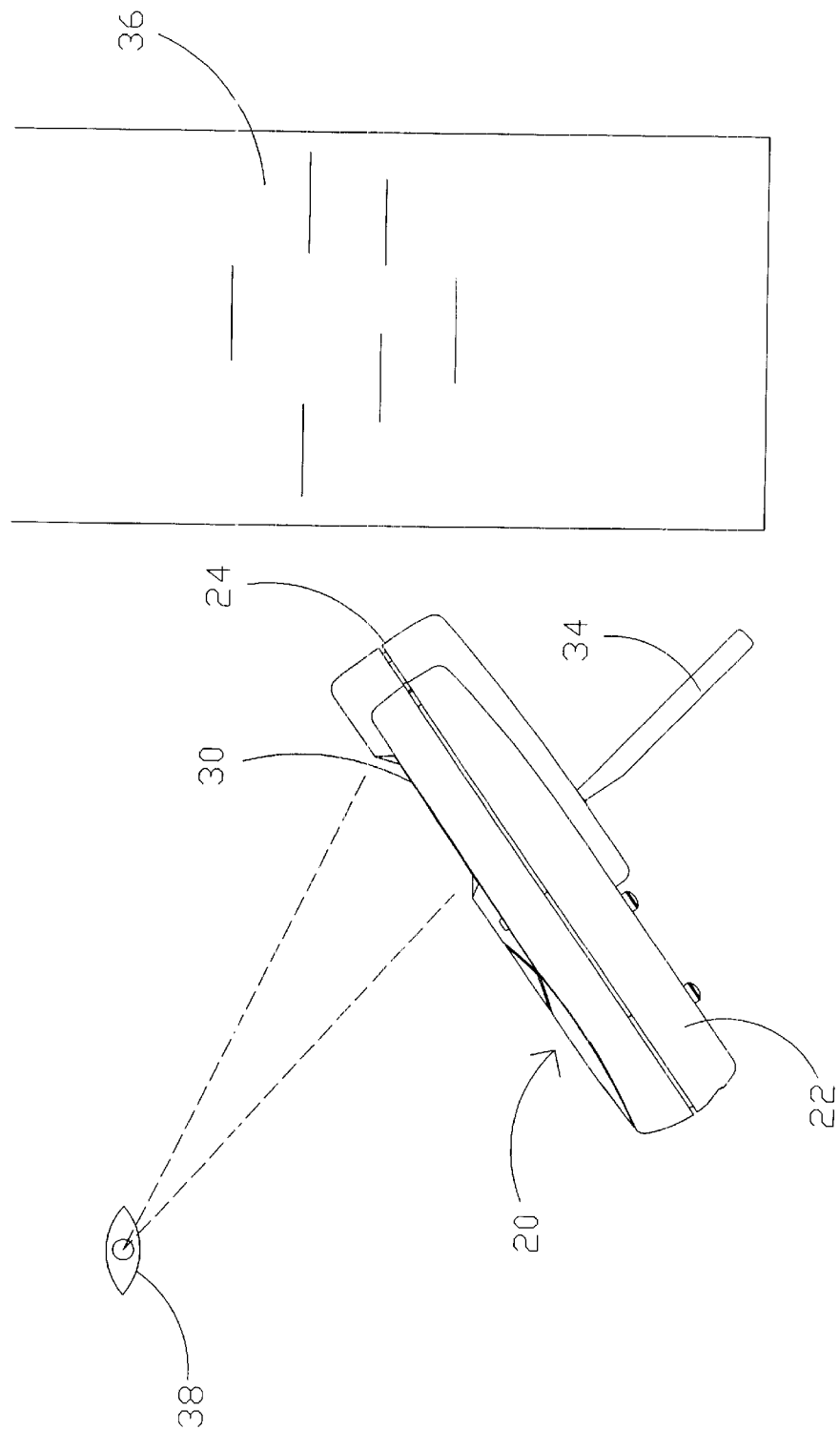
FIG. 3 is a diagram of an embodiment of the present invention, wherein the infrared thermometer stands upright.
Figure 4:
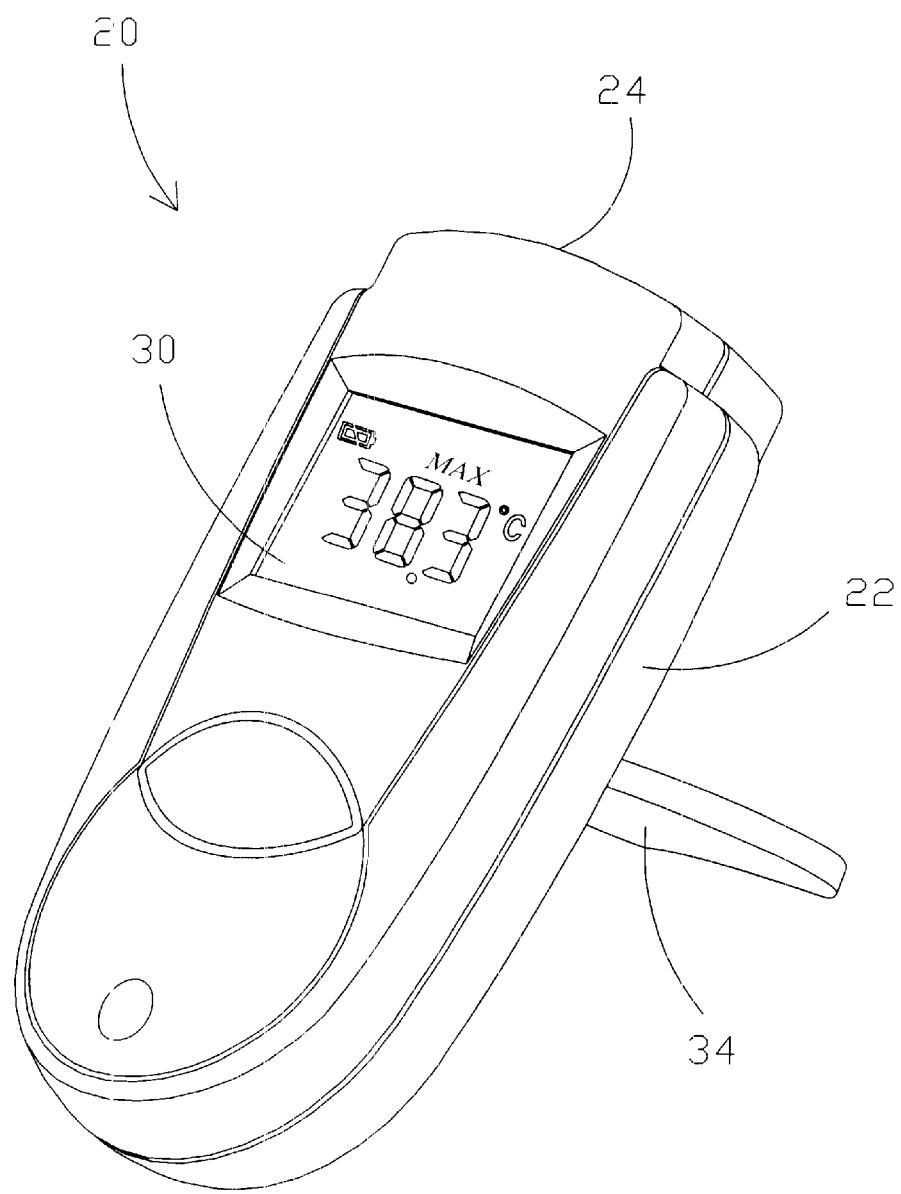
FIG. 4 is a diagram of the present invention standing upright for display.

As shown in FIGS. 3 and 4, if a target to be measured is at an angle of elevation, the mount 34 is pulled out from the main body 22 so that the main body 22 can be supported and adjust the angle of measurement of the two-way display infrared thermometer 20, thereby let the infrared thermometer 20 stand upright and the infrared wave-collecting device 24 at the front end aim upwards at a target 36 to be measured (e.g., hot water). At this time, the direction detection device 32 will automatically detect the horizontal state of the main body 22. The direction detection device 32 detects that the direction of the main body 22 is at an angle of elevation, and thus sends a signal to the control circuit, which then issues an instruction to drive the liquid crystal display 30 to display uprightly. Therefore, a user can simultaneously observe the target 36 and read and record the uprightly displayed temperature value from the direction of his eyes 38.

Figure 5:
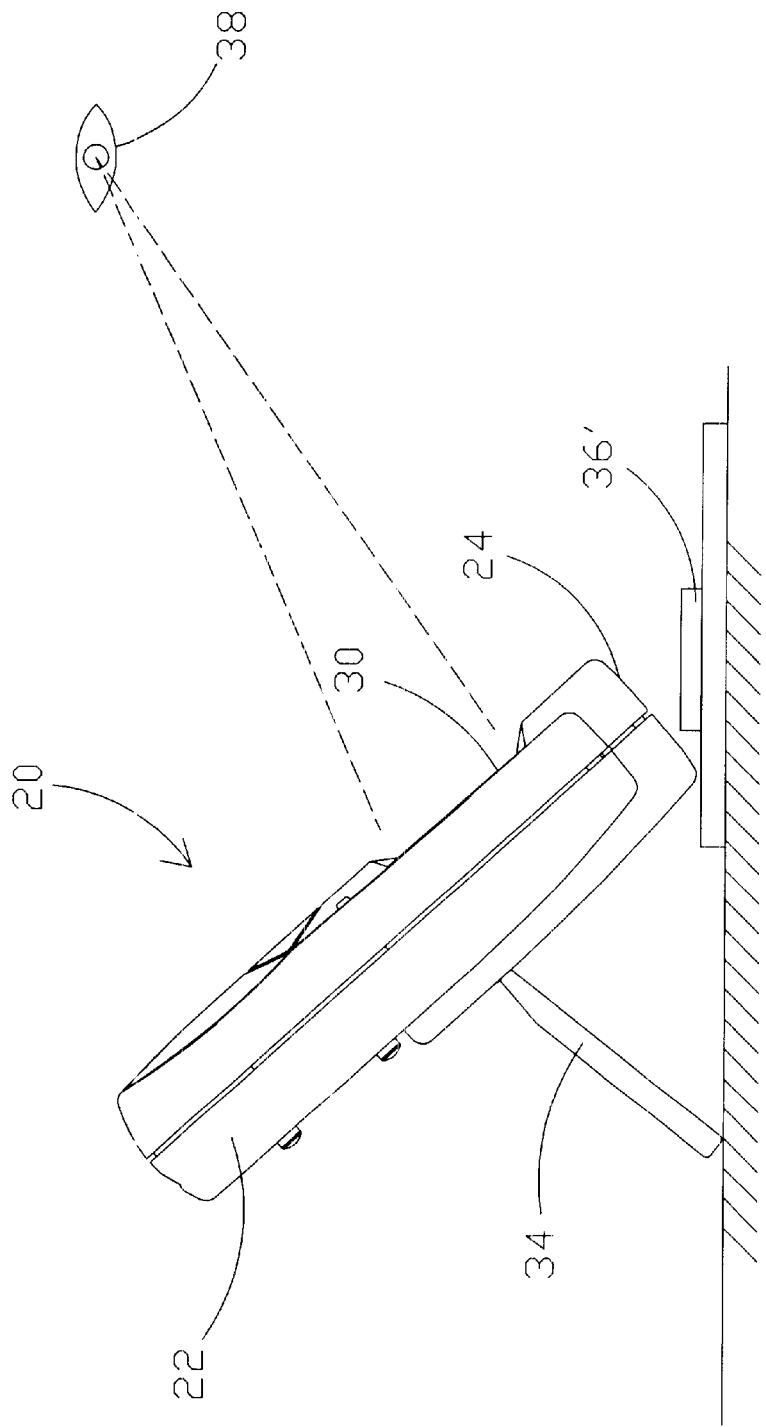
FIG. 5 is a diagram of another embodiment of the present invention, wherein the infrared thermometer stands upside down.
Figure 6:
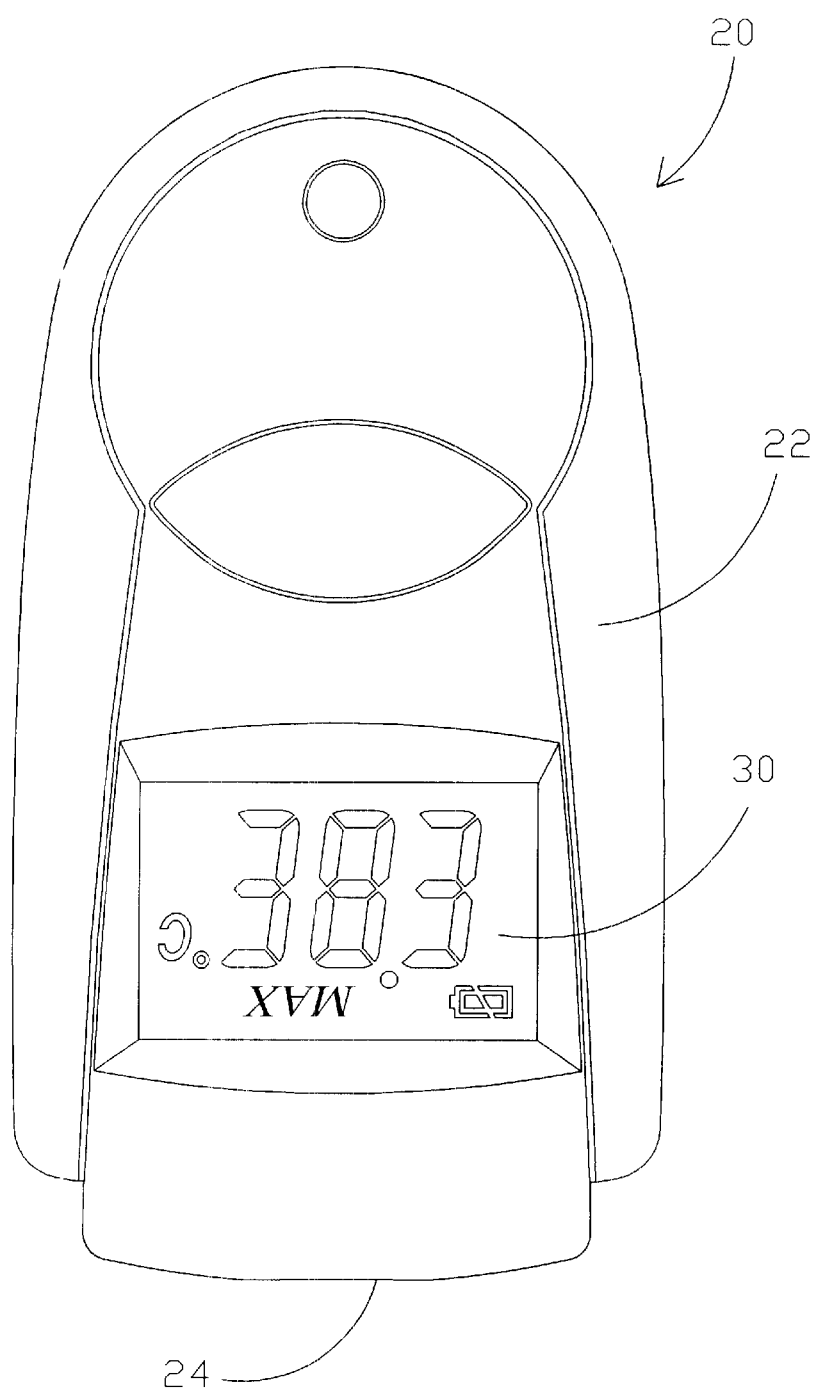
FIG. 6 is a diagram of the present invention standing upside down for display.

On the other hand, as shown in FIGS. 5 and 6, when the measured position is lower and at an angle of depression, the mount 34 is pulled out from the main body 22 so that the main body 22 can be supported and adjust the angle of measurement of the two-way display infrared thermometer 20, thereby let the infrared thermometer 20 stand upside down and the infrared wave-collecting device 24 at the front end aim downwards at a target 36' (e.g., an integrated circuit board) to be measured. At this time, the direction detection device 32 will automatically detect the horizontal state of the main body 22. The direction detection device 32 detects that the direction of the main body 22 is at an angle of depression, and thus sends a signal to the control circuit, which then issues an instruction to drive the liquid crystal display 30 to display upside down. Therefore, the user can read and record the uprightly displayed temperature value from the direction of the eyes 38, and can simultaneously observe the target 36'.

In addition to utilizing the direction detection device 32 to automatically detect the horizontal state of the main body 22 so as to determine the display direction of the liquid crystal display 30, the direction-switching device can also be manually switched to determine the display direction of the liquid crystal display 30.

To sum up, the two-way display infrared thermometer of the present invention utilizes a mount thereon to support a main body thereof. Moreover, the angle between the mount and the main body is adjusted to aim at a target to be measured. A direction detection device is also utilized to determine the display direction of a liquid crystal display. Therefore, the user can successfully observe the target and simultaneously read the uprightly displayed temperature value, thereby accomplishing the effects of quick reading and convenient observation and recording.

Although the present invention has been described with reference to the preferred embodiment thereof, it will be understood that the invention is not limited to the details thereof. Various substitutions and modifications have been suggested in the foregoing description, and other will occur to those of ordinary skill in the art. Therefore, all such substitutions and modifications are intended to be embraced within the scope of the invention as defined in the appended claims.

We claim:

1. A two-way display infrared thermometer, comprising:
    a main body;
    an infrared wave-collecting device for measuring temperature having a sensor disposed at a bottom thereof, said infrared wave-collecting device being disposed at a front end in said main body;
    a liquid crystal display disposed on a surface of said main body to display the measured temperature; and
    a direction detection device disposed in said main body and connected to a control circuit to automatically detect the horizontal state of said main body so as to send a signal to said control circuit, which then controls the display direction of said liquid crystal display.

2. The two-way display infrared thermometer as claimed in claim 1, wherein said main body further has a mount disposed thereon so that said main body can be supported thereupon and the angle of measurement can be adjusted.

3. The two-way display infrared thermometer as claimed in claim 1, wherein a thermal absorption device is further disposed around said infrared wave-collecting device in said main body.

4. The two-way display infrared thermometer as claimed in claim 1, wherein said direction detection device is either a mercury switch or a ball switch.

5. The two-way display infrared thermometer as claimed in claim 1, wherein a decimal point can be disposed at both sides of said liquid crystal display.

6. The two-way display infrared thermometer as claimed in claim 1, wherein a direction-switching device is further disposed on said main body for manually switching the display direction of said liquid crystal display.

7. A two-way display infrared thermometer, comprising:
    a main body;
    an infrared wave-collecting device for measuring temperature having a sensor disposed at a bottom thereof, said infrared wave-collecting device being disposed at a front end in said main body;
    a liquid crystal display disposed on a surface of said main body to display the measured temperature; and
    a direction-switching device disposed on said main body and connected to a control circuit, said direction-switching device being switched to send a switching signal to said control circuit, which then controls the display direction of said liquid crystal display.

8. The two-way display infrared thermometer as claimed in claim 7, wherein said main body further has a mount disposed thereon so that said main body can be supported thereupon and to thereby adjust the angle of measurement.

9. The two-way display infrared thermometer as claimed in claim 7, wherein a thermal absorption device is further disposed around said infrared wave-collecting device in said main body.

10. The two-way display infrared thermometer as claimed in claim 7, wherein a decimal point can be disposed at both sides of said liquid crystal display.

11. The two-way display infrared thermometer as claimed in claim 7, wherein said direction-switching device is either a switch or a key.

* * * * *